(12) United States Patent
Choi et al.

(10) Patent No.: US 7,710,938 B2
(45) Date of Patent: May 4, 2010

(54) MEDIUM ACCESS CONTROL UNIT

(75) Inventors: Hyung-Nam Choi, Hamburg (DE); Michael Eckert, Braunschweig (DE)

(73) Assignee: Infineon Technologies AG, Neubiberg (DE)

( * ) Notice: Subject to any disclaimer, the term of this patent is extended or adjusted under 35 U.S.C. 154(b) by 1267 days.

(21) Appl. No.: 11/227,963

(22) Filed: Sep. 14, 2005

(65) Prior Publication Data

US 2006/0062193 A1   Mar. 23, 2006

(30) Foreign Application Priority Data

Sep. 16, 2004  (DE) ........................ 10 2004 044 957

(51) Int. Cl.
*H04B 7/216* (2006.01)

(52) U.S. Cl. ........................ 370/342; 370/468; 370/331; 370/444

(58) Field of Classification Search ................. 370/342, 370/468, 335, 444, 331, 320
See application file for complete search history.

(56) References Cited

U.S. PATENT DOCUMENTS

| | | | |
|---|---|---|---|
| 6,683,866 B1 | 1/2004 | Stanwood et al. | |
| 6,944,178 B1* | 9/2005 | Charriere et al. | 370/444 |
| 7,200,135 B2* | 4/2007 | Choi et al. | 370/348 |
| 7,230,937 B2 | 6/2007 | Chi et al. | |
| 2003/0092382 A1 | 5/2003 | Vayanos et al. | |
| 2003/0153313 A1 | 8/2003 | Faerber et al. | |
| 2003/0193913 A1 | 10/2003 | Murata et al. | |
| 2004/0028078 A1 | 2/2004 | Beckmann et al. | |
| 2004/0228313 A1* | 11/2004 | Cheng et al. | 370/342 |
| 2004/0240471 A1 | 12/2004 | Terry | |
| 2005/0053035 A1* | 3/2005 | Kwak et al. | 370/331 |
| 2005/0099957 A1* | 5/2005 | Soldani et al. | 370/252 |
| 2005/0210154 A1* | 9/2005 | Verma et al. | 709/249 |

FOREIGN PATENT DOCUMENTS

| | | | |
|---|---|---|---|
| CN | 1423435 A | 6/2003 | |
| EP | 1 341 318 A2 | 9/2003 | |
| EP | 1 349 332 A1 | 10/2003 | |
| EP | 1 422 840 A2 | 5/2004 | |
| GB | 2 401 760 A | 11/2004 | |
| WO | WO-99/43178 A1 | 8/1999 | |
| WO | WO-01/47146 A1 | 6/2001 | |
| WO | WO-02/23936 A1 | 3/2002 | |
| WO | WO-03/001681 A2 | 1/2003 | |
| WO | WO-03/001681 A3 | 1/2003 | |
| WO | WO-2004/059869 A1 | 7/2004 | |

OTHER PUBLICATIONS

3GPP TS 25.301 v6.0.0 (Dec. 2003), *Technical Specification*, 3rd Generation Partnership Project; Technical Specification Group Radio Access Network; Radio Interface Protocol Architecture (Release 6).
RP-040081, Proposed Work Item on FDD Enhanced Uplink, TSG-RAN Meeting #23, Phoenix USA, Mar. 10-12, 2004.
3GPP TS 25.331 v6.2.0 (Jun. 2004), *Technical Specification*; 3rd Generation Partnership Project; Technical Specification Group Radio Access Network; RRC Protocol Specification.
3GPP TS 25.321 v3.17.0 (Jun. 2004), *Technical Specification*, 3rd Generation Partnership Project; Techinical Specification Group Radio Access Network; Medium Access Control (MAC) protocol specification, (Release 1999).
3GPP TS 25.133 v3.18.0 (Jun. 2006), *Techinical Specification*, 3rd Generation Partnership Project; Techinical Specification Group Radio Access Network; Requirements for Support of Radio Resource Management,(FDD), (Release 1999).

* cited by examiner

*Primary Examiner*—David Q Nguyen
(74) *Attorney, Agent, or Firm*—Dickstein, Shapiro, LLP.

(57) ABSTRACT

A check is carried out for those stored transport formats which have been declared as being temporarily permissible by a mobile radio base station to determine whether these transport formats satisfy a selection criterion which is specific to that mobile radio device. The transport format used for data transmission is selected exclusively from those transport formats which satisfy the selection criterion which is specific to that mobile radio device.

52 Claims, 5 Drawing Sheets

MEDIUM ACCESS CONTROL UNIT

CROSS-REFERENCE TO RELATED APPLICATION

This application claims priority to German Patent Application Serial No. 10 2004 044 957.0-42, which was filed Sep. 16, 2004 and is incorporated herein by reference in its entirety.

FIELD OF THE INVENTION

The invention relates to a medium access control unit, to a mobile radio device, and to a method for mapping data to be transmitted by means of a mobile radio device.

BACKGROUND OF THE INVENTION

A medium access control unit such as this, a mobile radio device such as this and a method such as this are known from the UMTS (Universal Mobile Telecommunications System) mobile radio system.

A UMTS mobile radio system normally has a core network (Core Network, CN), a mobile radio access network (UMTS Terrestrial Radio Access Network, UTRAN) and a large number of mobile radio terminals (User Equipment, UE). UMTS provides a transmission mode, referred to as the FDD mode (Frequency Division Duplex), in which signals are transmitted separately in the uplink direction (also referred to as the uplink path which denotes a signal transmission direction from a mobile radio terminal to a respective base station in the mobile radio access network) and in the downlink direction (also referred to as the downlink path, which refers to a signal transmission direction from a base station, which is respectively associated with the mobile radio terminal, in the mobile radio access network to the mobile radio terminal) by means of separate assignment of frequencies or frequency ranges.

UMTS defines an air interface, which is subdivided into three protocol layers, for transmission of data between a mobile radio terminal and a respective base station for a mobile radio cell. An overview and a detailed description of the UMTS air interface protocol layers can be found in 3GPP TS 25.301, Technical Specification, Third Generation Partnership Project; Technical Specification Group Radio Access Network; Radio Interface Protocol Architecture.

The 3GPP standardization committee ($3^{rd}$ Generation Partnership Project) are developing, as described in RP-040081, Proposed Work Item on FDD Enhanced Uplink, TSG-RAN Meeting #23, Phoenix, USA, 10-12 Mar. 2004, an improvement for packet data transmission via the dedicated transport channel DCH (Dedicated Channel) based on UMTS in the uplink direction for the UMTS-FDD mode.

One of the three protocol layers in the UMTS air interface is known as the Radio Resource Control (RRC) protocol layer. The RRC protocol or the RRC protocol layer is responsible for setting up and for clearance, as well as for reconfiguration of physical channels, transport channels, logical channels, signaling radio bearers and radio bearers, and for handling all of the parameters for the UMTS protocol layers for layer 1 and layer 2. For this purpose, the units in the RRC layer in the mobile radio terminal and in the mobile radio network control unit interchange appropriate RRC messages via the signaling radio bearers, as described in 3GPP TS 25.331, Technical Specification, Third Generation Partnership Project; Technical Specification Group Radio Access Network; RRC Protocol Specification.

For management purposes, in general for administration of mobile radio transmission resources in the mobile radio terminal, it is known in the context of uplink packet data transmission for the mobile radio terminal to signal to a mobile radio network control unit (Radio Network Controller, RNC) information about the amount of data traffic in a transport channel, at the RRC protocol layer plane. This is done by means of so-called measurement report messages. As illustrated in Table 1, below, the currently responsible mobile radio network control unit in this context indicates the data buffer storage filling levels, that is to say the filling level of the data buffer storages for the RLC units, for the relevant transport channel. In other words, this means that, in accordance with 3GPP TS 25.331, Technical Specification, Third Generation Partnership Project; Technical Specification Group Radio Access Network; RRC Protocol Specification, the number of data items to be transmitted which are currently located in the buffer storages of the RLC units in the respective mobile radio terminal is transmitted to the mobile radio network monitoring unit at the RRC layer plane.

In this context, the expression mobile radio transmission resources means in particular the transmission power of the mobile radio terminal, the number and the spreading factor of the assigned CDMA codes.

Table 1 shows one example of a measurement result list such as this, as is described in 3GPP TS 25.331, Technical Specification, Third Generation Partnership Project; Technical Specification Group Radio Access Network; RRC Protocol Specification:

TABLE 1

| Information Element/Group name | Need | Multi | Type and reference | Semantics description |
| --- | --- | --- | --- | --- |
| Traffic volume measurement results | OP | 1 to <maxRB> | | |
| >RB Identity | MP | | RB Identity 10.3.4.16 | |
| >RLC Buffer Payload | OP | | Enumerated (0, 4, 8, 16, 32, 64, 128, 256, 512, 1024, 2K, 4K, 8K, 16K, 32K, 64K, 128K, 256K, 512K, 1024K) | In bytes And N Kbytes = N*1024 bytes. Twelve spare values are needed. |
| >Average of RLC Buffer Payload | OP | | Enumerated (0, 4, 8, 16, 32, 64, 128, 256, 512, 1024, 2K, 4K, 8K, 16K, 32K, 64K, 128K, 256K, 512K, 1024K) | In bytes And N Kbytes = N*1024 bytes. Twelve spare values are needed. |
| >Variance of RLC Buffer Payload | OP | | Enumerated (0, 4, 8, 16, 32, 64, 128, 256, 512, 1024, 2K, 4K, 8K, 16K) | In bytes And N Kbytes = N*1024 bytes. Two spare values are needed. |

On reception of information such as this, the mobile radio network monitoring unit can use this information to implement appropriate configurations of the mobile radio terminal in order, for example, to increase or to restrict the usable transport formats for a mobile radio terminal, or to carry out a handover to another mobile radio cell, reconfiguration of the dedicated physical channels or an RRC state change, in particular from a first RRC state CELL_DCH to a second RRC state CELL_FACH.

The measurement result list illustrated in Table 1 is thus sent from an RRC unit in the mobile radio terminal to the RRC unit in the corresponding mobile radio network control unit, and the respective RLC data buffer storage filling level is indicated for each radio bearer (RB). The values may be quoted either as an absolute value (RLC Buffer Payload), as an average, value (Average of RLC Buffer Payload), or as a variance from a defined value (Variance of RLC Buffer Payload).

The 3GPP standardization committee is currently working on the improvement of packet data transmission via dedicated transport channels in the uplink path, that is to say for the uplink direction for the UMTS air interface for the FDD mode, in order to increase the data throughput and the transmission rate. For this purpose, a new dedicated transport channel referred to as the Enhanced Dedicated Channel (E-DCH) has been introduced in order to improve the delineation from the already existing dedicated transport channel DCH. The major characteristics of this new transport channel include the use of a Hybrid Automatic Repeat Request method (HARQ) based on the N channel Stop&Wait method, scheduling which is monitored by the base station, which is also referred to in UMTS as NodeB, as well as frame lengths of no more than 10 ms.

The N channel Stop&Wait-HARQ method is a transmission protection method, in which a total of N so-called HARQ processes are configured for one mobile radio terminal, with an HARQ process in each case representing one instance of the Stop&Wait method. The data for each HARQ process is sent to the network and is temporarily stored until the network receives a confirmation that the data has been received correctly (Acknowledgement, ACK). Otherwise, that is to say if the data has not been received correctly (Negative Acknowledgement, NACK), the data is retransmitted to the network.

NodeB monitored scheduling is a method in which the scheduling in the mobile radio terminal, that is to say the selection of an appropriate transport format from a set of defined transport formats for the E-DCH transport channel, is monitored in such a way that the NodeB can temporarily restrict or extend the use of transport formats from the set of defined transport formats for the E-DCH transport channel as a function of the traffic situation in the respective mobile radio cell for a mobile radio terminal.

However, so far, no decisions have yet been made on the details of how the data will be transmitted via the new transport channel E-DCH via a UMTS air interface. One possible solution is to subdivide the data items on the basis of their priorities between different data buffer storages, so-called Priority Queues (PQ), which are then processed with more or less priority corresponding to their importance, and are thus transmitted.

As stated above, a transmission protection method (HARQ) is used, in which the network sends the mobile radio terminal a confirmation that the data has or has not been received correctly. For this function as well, the mobile radio terminal contains different data buffer storages in order to temporarily store the data until correct reception has been acknowledged.

Both functions are carried out within the MAC protocol layer in the newly provided protocol sublayer, that is to say a so-called Medium Access Control Enhanced Uplink (MAC-e) entity, which is present, that is to say implemented, both at the terminal end and at the network end. At the network end, the entity which carries out the communication protocol in accordance with MAC-e is located in the NodeB, that is to say in the UMTS base station.

One important function of the MAC-e protocol sublayer in the mobile radio terminal (subscriber terminal, User Equipment, UE) is to carry out the scheduling of the data to be transmitted for the uplink transmission path (Uplink Direction) on the basis of a transport format selection method, that is to say to select a suitable transport format for the E-DCH transport channel at predetermined defined times as a function of the instantaneously permissible transmission rate, the priority of the data to be transmitted and the available transmission power for the E-DCH transport channel.

The transport format selection method described in 3GPP TS 25.321, Technical Specification, Third Generation Partnership Project, Technical Specification Group Radio Access Network, Medium Access Control (MAC) Protocol Specification, and 3GPP TS 25.133, Technical Specification, Third Generation Partnership Project, Technical Specification Group Radio Access Network, Requirements for Support of Radio Resource Management (FDD), will be explained in more detail in the following text.

A defined number of dedicated transport channels (Dedicated Channels, DCH) are configured on setting up a communication link by the mobile radio network control unit for the mobile radio terminal as a function of the number and the nature of communication services which a mobile radio terminal, or in other words subscriber appliance, is using in the course of transmission of data in the uplink direction. A Transport Format Set (TFS), also referred to as a set of transport formats in the following text, is configured for each transport channel and includes a defined number of transport formats. The permissible combination of transport formats of all DCH transport channels is defined by the so-called Uplink Transport Format Combination Set (TFCS). The MAC-d unit in the mobile radio terminal carries out the scheduling on the basis of the Uplink Transport Format Combination Sets using the transport format combination selection method, that is to say a suitable transport format for each configured transport channel is selected at defined times as a function of the instantaneous transmission rate and the data priority of the logical channels which are mapped onto the respective transport channel, and as a function of the available transmission power in the mobile radio terminal. Details relating to this procedure are described in 3GPP TS 25.321, Technical Specification, Third Generation Partnership Project, Technical Specification Group Radio Access Network, Medium Access Control (MAC) Protocol Specification, and 3GPP TS 25.133, Technical Specification, Third Generation Partnership Project, Technical Specification Group Radio Access Network, Requirements for Support of Radio Resource Management (FDD).

The scheduling method ensures that the data for a communication service is transmitted via the air interface in accordance with its quality of service profile (QoS profile). It also ensures that the transport format combination selection is matched to the respective transmission situation in the mobile radio cell, that is to say only a limited number of transport format combinations are available when the transmission situation is poor, so that the interference produced by the mobile radio terminal itself in the uplink transmission direction remains within limits. In contrast, when the signal transmission situation in the mobile radio cell is good, all of the transport format combinations are normally available, so that the interference which is produced by a mobile radio terminal itself in the uplink transmission direction varies within the allocated quality of service range.

The major characteristics of the transport format combination selection method are:

A status check of the individual transport format combinations within the given transport format combination set is carried out at defined times. On the basis of this status check, one transport format combination may be located in or associated with one of the following states, as is illustrated in the state diagram 700 in FIG. 7:
- a first state 701, which is referred to as a "Supported State",
- a second state 702, which is referred to as an "Excess Power State", and
- a third state 703, which is referred to as a "Blocked State".

The status check of the transport format combinations is carried out by means of a power estimate based on the current transmission power and the maximum permissible transmission power of the mobile radio terminal.

Figure 7:
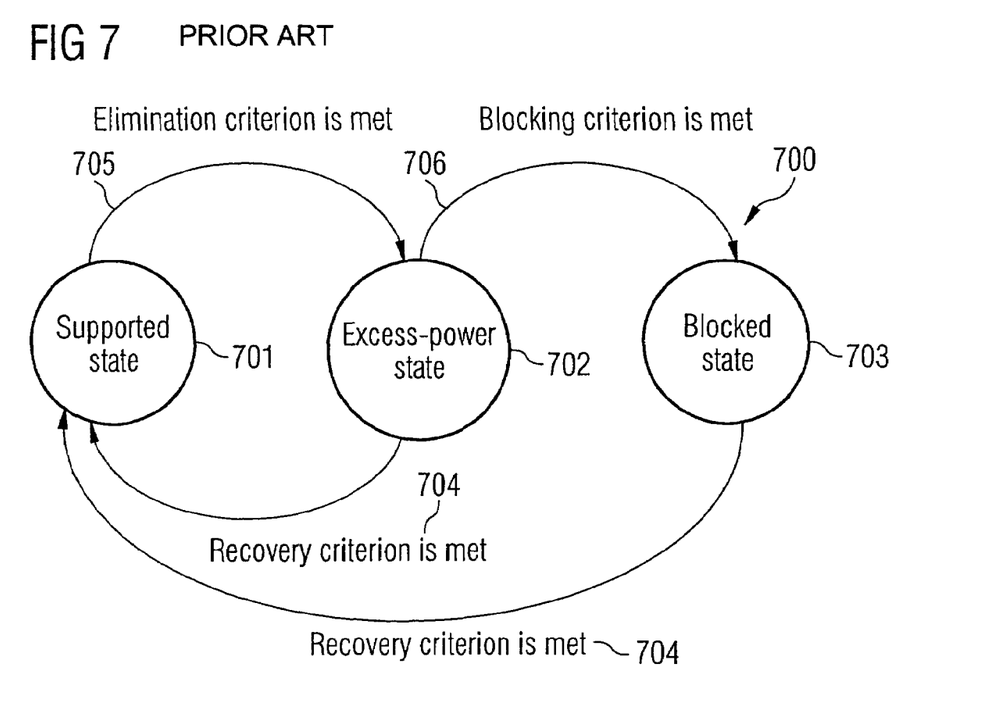
FIG. 7 shows a state diagram illustrating the states of a transport format combination according to the prior art.

All the transport format combinations which do not satisfy the so-called "Elimination Criterion", that is to say, in other words, those which require a transmission power which is less than the maximum permissible transmission power, are allocated to the first state 701, that is to say to the "Supported State". The state changes from the second state 702 or from the third state 703 to the first state 701 are in each case annotated with the reference symbol 704 "Recovery Criterion is met".

All of the transport format combinations which require a transmission power which is greater than the maximum permissible transmission power are allocated to the second state 702 "Excess Power State", with the state change from the first state 701 to the second state 702 in FIG. 7 be annotated in FIG. 7 with the reference symbol 705 "Elimination Criterion is met".

All of the transport format combinations which satisfy the so-called "Blocking Criterion", that is to say which are in the second state 702 for a defined time period, are allocated to the third state 703 "Blocked State", with the state change from the second state 702 to the third state 703 being annotated with the reference symbol 706 "Blocking Criterion is met".

The only transport format combinations which are taken into account in the transport format combination selection method are those in the first state 701 "Supported State", in other words the MAC-d unit selects those transport format combinations from the transport format combinations which are in the first state 701 "Supported State", as a function of the instantaneous transmission rate and of the data priority of the logical channels, and these are mapped onto the individual DCH transport channels. In this case, the logical channels are assigned different priorities from 1 to 8, with a priority of 1 representing the highest priority, and a priority of 8 representing the lowest priority. Those data packets from the logical channels which have a higher priority are given preference in the transport format combination selection method, on the basis of these priorities.

For transport format combinations which are in the second state 702 "Excess Power State" or in the third state 703 "Blocked State", the status of these transport format combinations is checked continuously. Those transport format combinations which satisfy the so-called "Recovery Criterion", are then changed once again for the first state 701 "Supported State", that is to say they can be considered once again in the transport format combination selection method. The state changes are annotated in FIG. 7 with the reference symbol 704 "Recovery Criterion is met".

Those transport format combinations which are in the second state 702 "Excess Power State" are normally ignored in the transport format combination selection method. One exception to this is the transport format combinations in the so-called "Transport Format Combination Minimum Set" (TFC Minimum Set). The transport format combinations in the TFC Minimum Set, that is to say the transport format combinations in the minimum set, are specified by the mobile radio network control unit RNC and are intended to ensure a minimum guaranteed data transmission rate for the mobile radio terminal. These transport format combinations are thus in any case always taken into account in the transport format combination selection method even if they require a transmission power which is greater than the maximum permissible transmission power in the mobile radio terminal.

As has been described above, the mobile radio network control unit RNC is responsible for carrying out the mobile radio resource management of all of the mobile radio cells and mobile radio terminals within a mobile radio network subsystem (Radio Network Subsystem, RNS). It is known for the mobile radio network control unit to be able to configure a mobile radio terminal to carry out appropriate measurements in order to allow this to be done.

On the basis of the UMTS mobile radio communication system, the individual measurements which can be carried out by the mobile radio terminal are subdivided into six different types:
- intrafrequency measurements,
- interfrequency measurements,
- intersystem measurements,
- quality measurements,
- internal measurements, and
- measurements for finding the position of the mobile radio terminal.

Details of the measurements are described in 3GPP TS 25.331, Technical Specification, Third Generation Partnership Project; Technical Specification Group Radio Access Network; RRC Protocol Specification.

Figure 8:
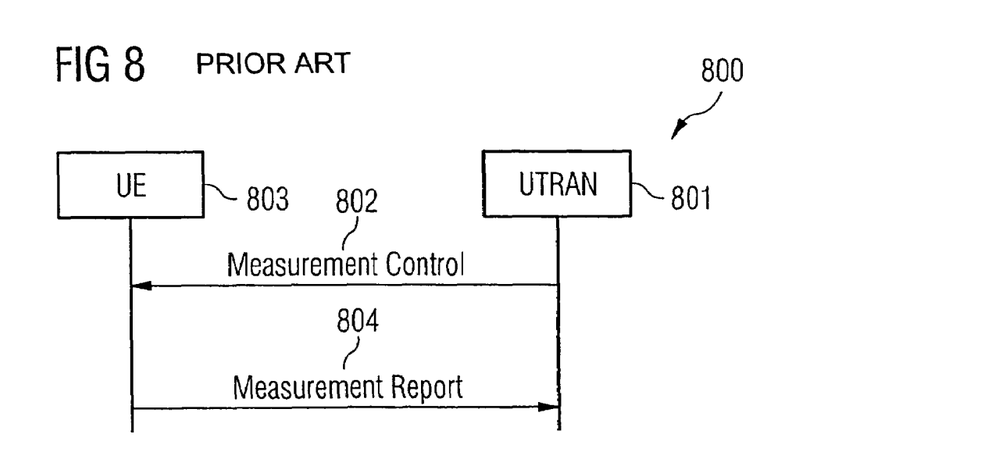
FIG. 8 shows a message flow diagram, illustrating the request for and transmission of a measurement report message between a mobile radio network monitoring unit and a mobile radio terminal according to the prior art.

As is illustrated in the message flow diagram 800 in FIG. 8, the mobile radio network control unit 801 initiates a specific measurement by sending a so-called measurement control message 802 in the downlink direction to the mobile radio terminal 803, at the RRC protocol plane, via the so-called Signaling Radio Bearers (SRB). This monitoring message 802 informs the mobile radio terminal 803 of when, how and which measurements it should carry out. Once a measurement has been carried out, the mobile radio terminal 803 produces and sends an appropriate so-called measurement report message 804 with the results of the measurement in the uplink direction to the mobile radio network monitoring unit 801.

The mobile radio network monitoring unit 801 can use the information from the measurement report message 804 to implement appropriate configurations for the mobile radio terminal 803, for example to reconfigure the set of transport formats or the dedicated physical channels for the mobile radio terminal 803, or to carry out a handover to another mobile radio cell.

The procedure described on the basis of the prior art for selection of the respectively used transport formats and transport format combinations is highly computation intensive since all the checks and classifications as well as state transitions are carried out in the mobile radio terminal itself, and since the status checks in the mobile radio terminal must always be carried out for all of the transport formats stored in it and transport format combinations stored in it.

Furthermore, the respective status of all of the transport format combinations must be checked, and changed if appropriate, at the respectively predetermined times. This also means a considerable computation time requirement in the mobile radio terminal.

EP 1 341 318 A2 describes a method for controlling the transmission power in an HS-DPCCH (High Speed-Dedicated Physical Control Channel) in a mobile radio terminal. The mobile radio terminal is informed about any transmission power offset, and any transmission power increase in the uplink HS-DPCCH is determined. The transmission power offset is signaled to the NodeB.

WO 2001/47146 A1 describes a method for controlling a mobile radio link between a mobile radio network and a mobile radio terminal. The current transmission power of the mobile radio terminal is taken into account in the course of the allocation of mobile radio resources, and in other mobile radio network operations.

WO 2002/23936 A1 describes a method for optimization of downlink capacities, taking into account the transmission power between a plurality of mobile radio cells. An overload situation in an overloaded mobile radio cell is determined by means of the mobile radio network. An adjacent mobile radio cell in which no overload situation has occurred is identified. Furthermore, a user node which has set up a communication link to the mobile radio network is determined, the downlink data transmission from the overloaded mobile radio cell to the user node is prevented and a downlink data transmission is permitted using a communication link from the mobile radio cell which is not overloaded.

WO 99/43178 A1 describes a method in which different measurement report messages are checked by the mobile radio terminal on the basis of different trigger events in the mobile radio network.

WO 2004/059869 A1 describes a method for selection of transport format combinations. In this method, the physical layer sends a notification message to the MAC protocol layer, which is used to signal when the maximum transmission power for a transmission has been reached.

Document U.S. 2003/0193913 A1 discloses a method for selection of a transport format combination, with classes of transport format combinations being formed, and one class being selected on the basis of a transmission power level.

The document U.S. 2003/0092382 A1 discloses a method for determination of permissible transport format combinations, with a state for each transport format combination being determined on the basis of the transmission power required for that transport format combination, and a selection being made on the basis of the states.

2003/0153313 A1 describes a method for controlling an intersystem handover, in which a mobile radio subscriber is signaled a reduced set of transport format combinations.

The document 2004/0028078 A1 discloses a method for transmission of data packets by means of a radio interface, in which a control unit sends a configuration message and a transport format is selected on the basis of information contained in the configuration message.

WO 03/001681 A1 describes a method for modulation of a radio link, in which a number of channelization codes and a modulation and coding scheme are selected adaptively, and information relating to the selected modulation and coding scheme and the selected number of channelization codes is transmitted to a receiver by means of the radio link.

SUMMARY OF THE INVENTION

A medium access control unit for a mobile radio device for mapping data to be transmitted by means of the mobile radio device from at least one logical channel to at least one transport channel. The medium access control unit has at least one transport format memory for storage of a plurality of transport formats, with a transport format including control parameters on the basis of which the data is mapped by the medium access control unit from the at least one logical channel to the at least one transport channel. The medium access control unit also has at least one transport format selection unit for selection of a respective transport format to be used from the plurality of stored transport formats. The transport format selection unit is designed such that: a) a check is carried out for those stored transport formats which satisfy a selection criterion which is predetermined by a mobile radio network unit, in order to determine whether the stored transport formats satisfy a selection criterion which is specific to the mobile radio device, and b) the transport format which is used for mapping the data to the at least one transport channel is selected from those transport formats which satisfy the selection criterion which is specific to the mobile radio device.

BRIEF DESCRIPTION OF THE DRAWINGS

Exemplary embodiments of the invention will be explained in more detail in the following text, and are illustrated in the figures, in which.

DETAILED DESCRIPTION OF PREFERRED EMBODIMENTS OF THE INVENTION

The invention is based on the problem of providing simpler selection than in the case of the prior art of one or more transport formats in the medium access control layer in a mobile radio terminal.

The problem is solved by the medium access control unit, by the mobile radio device and by the method for mapping data to be transmitted by means of a mobile radio device.

A medium access control unit for a mobile radio device is designed for mapping of data to be transmitted by means of the mobile radio device from at least one logical channel to at least one transport channel. The medium access control unit has at least one transport format memory for storage of a plurality of transport formats, with a transport format including control parameters on the basis of which the data is mapped by the medium access control unit from the at least one logical channel to the at least one transport channel. Furthermore, the medium access control unit includes at least one transport format selection unit for selection of a respective transport format to be used from the plurality of stored transport formats. The transport format selection unit is designed in such a way that a check is carried out for those stored transport formats which satisfy a selection criterion which is predetermined by a mobile radio network unit, in order to determine whether they satisfy a selection criterion which is specific to that mobile radio device. The transport format selection unit is also designed in such a way that the transport format which is used for mapping the data to the at least one transport channel is selected from those transport formats which satisfy the selection criterion which is specific to that mobile radio device.

In a method for mapping data to be transmitted by means of a mobile radio device from at least one logical channel to at least one transport channel in a medium access control protocol layer in the mobile radio device, a check is carried out for those stored transport formats in the mobile radio device which satisfy a selection criterion which is predetermined by a mobile radio network unit, in order to determine whether they satisfy a selection criterion which is specific to that mobile radio device. A transport format includes control parameters on the basis of which the data is mapped by the medium access control unit from the at least one logical channel to the at least one transport channel. The transport format which is used for mapping the data to the at least one transport channel is selected from those transport formats which satisfy the selection criterion which is specific to that mobile radio device.

A mobile radio device has a medium access control unit as described above.

The invention can clearly be seen in the selection of a suitable transport format, or possibly a suitable transport format combination, in a mobile radio device, preferably in a mobile radio terminal, in which a plurality or a large number of transport formats and/or transport format combinations are normally stored, which are predetermined by a mobile radio network unit, preferably a mobile radio network control unit, in accordance with UMTS, of a radio network control unit. The transport formats or the transport format combinations when a plurality or a large number of transport channels exist onto which the data is intended to be mapped from the logical channels, are temporarily changed by the mobile radio network unit, that is to say by the mobile radio network control unit or a UMTS base station, that is to say a NodeB, that is to say they are added to or restricted. In other words this means that, on the basis of UMTS, the transport format set or the transport format combination set can be temporarily restricted or extended by the mobile radio network control unit or the UMTS base station. This procedure corresponds to the network-monitoring scheduling which is known per se and has been described above. This temporary predetermination of a basic set of transport formats or transport format combinations which may possibly be used, with this predetermined process being carried out in the network, is used, according to the invention, as a selection criterion which is predetermined in the network.

One aspect of the invention is clearly based on a portion of the selection of the transport formats or transport format combinations being transferred to the network and making use of the network scheduling, which is known per se, in order to use this already restricted or extended "basic set" of possibly permissible transport formats or transport format combinations as the basis for carrying out the further check to determine whether the respective transport formats or transport format combinations are suitable for the transmission of data controlled by the medium access control unit. Thus, according to the invention and in comparison to the prior art, the entire set of transport formats or transport format combinations which are stored in the mobile radio terminal are no longer checked to determine their state and their usability, and, instead of this, it is assumed that a basic set of transport formats or transport format combinations exist which is already matched to the temporary mobile radio cell characteristics.

On the basis of the set of possible permissible transport formats or transport format combinations which has already been extended or restricted in the network, the medium access control unit now, according to the invention, itself checks whether the transport formats or transport format combinations in this predetermined set satisfy a selection criterion which is specific to that mobile radio device, for example the maximum permissible transmission power in the mobile radio device, and, from this set (which can also be regarded on the basis of a criterion which is internal to the mobile radio device as a possible transport format or transport format combination for data transmission), the transport format selection unit selects for each transmission time interval (TTI) a transport format or a transport format combination for mapping of the data from the logical channel or channels to the transport channel or channels in accordance with the respectively used medium access control protocol, or subprotocol.

A check is thus clearly carried out for those stored transport formats which have been declared by a mobile radio base station as being temporarily permissible, to determine whether these transport formats satisfy a selection criterion which is specific to that mobile radio device. The transport format which is used for data transmission is selected exclusively from those transport formats which satisfy the selection criterion which is specific to that mobile radio device.

In this context, it should be noted that the invention can be implemented in any medium access control protocol layer or in any medium access control protocol sublayer, for example even in an RLC protocol layer which is known per se, in which case the data to be transmitted is selected from the buffer storages in the RLC protocol layer for transmission of the data in the transport channels.

The refinements of the invention described in the following text relate both to the medium access control unit and to the mobile radio device, as well as to the method for mapping of the data to be transmitted from at least one logical channel to at least one transport channel. The described functionalities can be implemented in the mobile radio device both by means of software, that is to say by means of a specific computer program, or by means of hardware, that is to say by means of a specific electronic circuit, or in a hybrid form, partially in software and partially in hardware, in which case the individual functions can be implemented split in any desired manner between hardware and/or software.

According to one refinement of the invention, the medium access control unit has a plurality of priority queue buffer storages, with at least some of the priority queue buffer storages each being allocated a priority value, on the basis of which the data transmission preferably takes place and the data to be transmitted is selected from the buffer storages, for transmission of the data in the transport channels. The medium access control unit is designed in such a way that the data which is temporarily stored in the respective priority queue buffer storage is read and transmitted as a function of the priority values and/or the filling levels of the priority queue buffer storages. According to this refinement, an automatic repeat request control unit is preferably also provided for carrying out one or more automatic repeat request processes for transmission of the data which has been temporarily stored in the priority queue buffer storages, with the automatic repeat request control unit preferably being designed to carry out one or more hybrid automatic repeat request processes for transmission of the data which has been temporarily stored in the priority queue buffer storages.

Another refinement of the invention provides for the automatic repeat request control unit to be designed to carry out one and only one automatic repeat request process per priority queue buffer storage.

Refinements of the invention as described above clearly mean that the medium access control unit is preferably designed in accordance with the medium access control enhanced uplink subprotocol as a medium access control enhanced uplink unit.

According to another refinement of the invention, the automatic repeat request control unit is designed to carry out one, and only one, automatic repeat request process for each priority queue buffer storage. In accordance with this development of the invention, provision is preferably made for the medium access control unit to be designed to select one and only one transport format for each automatic repeat request process.

If the data is intended to be mapped onto a plurality of transport channels, then a plurality of transport formats are selected, preferably in the form of a transport format combination, that is to say in this case one transport format combination is selected in the manner described above from a predetermined set of transport format combinations.

In another refinement of the invention, one or more automatic repeat request buffer storages are provided, with each automatic repeat request buffer storage being associated with one, and preferably with only one, automatic repeat request process. Each automatic repeat request process is preferably associated with one, and only one, buffer storage. The medium access control unit is designed in such a way that the transport format or formats is or are selected as a function of the filling levels of the automatic repeat request buffer storages.

This allows highly flexible control of the selection of the data to be transmitted with respect to the actual physical transmission conditions and the filling levels of the individual buffer storages, thus achieving optimized control of the data transmission at the medium access control layer plane.

The selection criterion which is specific to that mobile radio device is preferably the maximum available transmission power of the mobile radio device, and particularly preferably the maximum available transport channel transmission power of the mobile radio device, and furthermore preferably the maximum available enhanced uplink transport channel transmission power of the mobile radio device.

The use of this selection criterion allows the data to be transmitted to be selected in a manner which is highly specific for the mobile radio device.

Another refinement of the invention provides for the transport format selection unit to be designed in such a way that a predetermined minimum set of transport formats is associated with those transport formats from which the transport format selection unit selects the transport format used for transmission of the data, in step b). In other words, this means that a set of transport formats which, in accordance with UMTS, correspond to the minimum set of transport formats (that is to say the transport format minimum set) is in each case regarded as transport formats which can be used for transmission of the data when at least one transport format in the minimum set is present.

This ensures that a transport format is always available for selection and transmission of data in the medium access control layer.

According to another refinement of the invention, the transport format selection unit is designed such that a check is carried out to determine whether more transmission power than is available in the mobile radio device is required for transmission of the data using one transport format from the minimum set of transport formats. In this case, a message generating unit is also provided in the medium access control unit and is designed to form an electronic first message, to be transmitted to the network unit, in the situation where it is found that more transmission power than is available in the mobile radio device is required for transmission of the data using one transport format from the minimum set of transport formats. This message is preferably in the form of a measurement report message in accordance with the UMTS communication standard.

It should be noted that this aspect of the invention, specifically a measurement report message whose generation and transmission are initiated and controlled by the mobile radio device, can be transmitted to the UMTS base station and/or the radio network monitoring unit independently of the method described above.

The production and transmission of a measurement report message, triggered at the terminal end, for notification of an "alarm situation" in the mobile radio device differs from the UMTS communication standard, as it is currently provided, in that the message is no longer produced and transmitted only in response to requests from the UMTS base station or the mobile radio network monitoring unit, but on the basis of an event which can be predetermined, and occurs and is detected in the mobile radio device itself.

Furthermore, a message generating unit can be provided which is designed to form an electronic second message, to be transmitted to the network unit, in the situation where it is found in method step b) described above that no transport format is available for selection, with the second message likewise preferably being in the form of a measurement report message.

One fundamental aspect can clearly be seen in the advantageous procedure for selection of transport formats, in particular for the E-DCH transport channel in accordance with the UMTS communication system, and in a method for signaling an overload situation for the transmission power of a subscriber terminal. A transport format selection method is clearly defined for the E-DCH transport channel, which takes account of the techniques of Hybrid Automatic Repeat Request (HARQ) and NodeB, that is to say the UMTS base station, controlled scheduling for the selection of the data to be transmitted from the logical channels in the course of mapping onto the E-DCH transport channel.

A two-stage status check is thus carried out for the individual E-DCH transport formats. On the basis of these status checks of the transport formats, one transport format may be in one of the following states, which will be explained in more detail in the following text: "Available State", "Restricted State" or "Valid State".

Two new indicators in order to indicate an overload situation for the E-DCH transmission power in the subscriber terminal are defined in the RRC protocol layer plane for the measurement report messages, specifically on the one hand the indication of the situation in which a transport format in the transport format minimum set requires more transmission power than is currently available in the mobile radio terminal, or on the other hand, the indication of the situation in which there is no permissible transport format whatsoever available for selection in the mobile radio device.

The mobile radio device is preferably in the form of a mobile radio terminal, which is particularly preferably designed to receive and to transmit data in accordance with one or more protocols of a cellular mobile radio system.

The mobile radio terminal is particularly preferably designed to communicate in a UMTS mobile radio system, in other words the mobile radio terminal is designed to receive and to transmit data in accordance-with one or more protocols of a UMTS mobile radio system.

Figure 1:
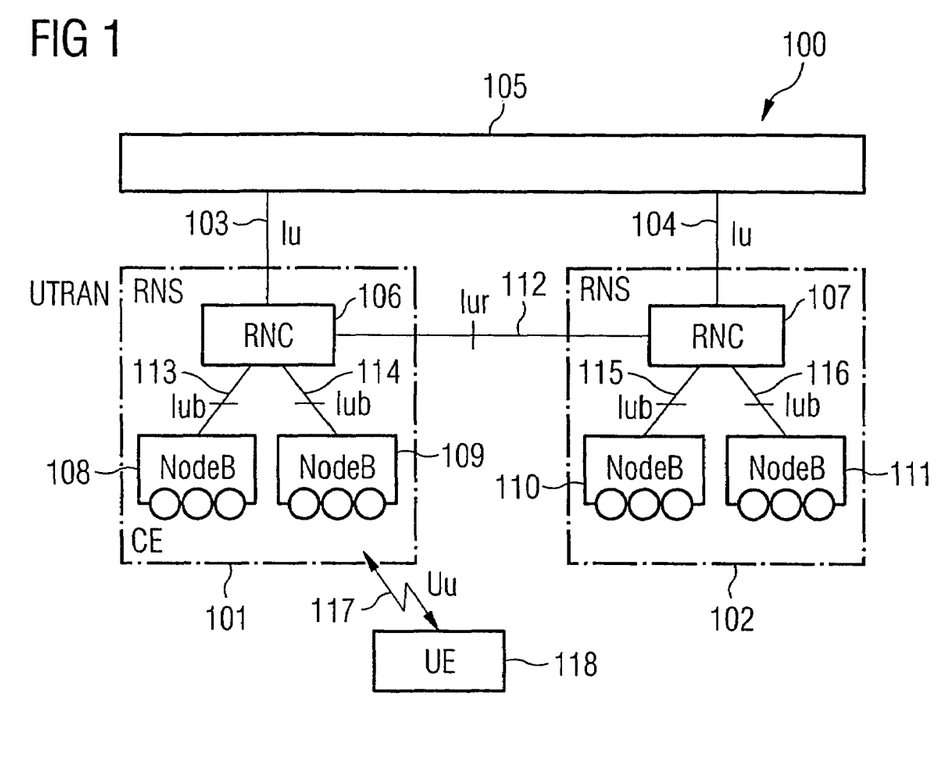
FIG. 1 shows a communication system according to one exemplary embodiment of the invention.

FIG. 1 shows a UMTS mobile radio system 100, illustrating in particular, in order to simplify the illustration, the components of the UMTS mobile radio access network (UMTS Terrestrial Radio Access Network, UTRAN), which has a plurality of mobile radio network subsystems (Radio Network Subsystems, RNS) 101, 102, each of which are connected to the UMTS core network (Core Network, CN) 105 by means of a so-called Iu interface 103, 104. A mobile radio network subsystem 101, 102 in each case has a mobile radio network control unit (Radio Network Controller, RNC) 106, 107 and one or more UMTS base stations 108, 109, 110, 111, which are also referred to, in accordance with UMTS, as NodeB.

Within the mobile radio access network, the mobile radio network control units 106, 107 of the individual mobile radio network subsystems 101, 102 are connected to one another by means of a so-called Iur interface 112. Each mobile radio network control unit 106, 107 in each case monitors the allocation of mobile radio resources of all the mobile radio cells in a mobile radio network subsystem 101, 102.

A UMTS base station 108, 109, 110, 111 is in each case connected by means of a so-called Iub interface 113, 114, 115, 116 to a mobile radio network control unit 106, 107, which is associated with the UMTS base station 108, 109, 110, 111.

Clearly, in radio terms, each UMTS base station 108, 109, 110, 111 covers one or more mobile radio cells (CE) within a mobile radio network subsystem 101, 102. Message signals or data signals are transmitted by means of an air interface, referred to in accordance with UMTS as a Uu air interface 117, preferably using a multiple access transmission method, between a respective UMTS base station 108, 109, 110, 111 and a subscriber terminal 118 (user equipment, UE), which is also referred to in the following text as mobile radio terminal, in a mobile radio cell.

Separate signal transmission is achieved in the uplink and downlink directions (uplink: signal transmission from the mobile radio terminal 118 to the respective UMTS base station 108, 109, 110, 111; downlink: signal transmission from the respectively associated UMTS base station 108, 109, 110, 111 to the mobile radio terminal 118) by means of appropriate, separate assignment of frequencies or frequency ranges, for example using the UMTS-FDD mode (Frequency Division Duplex).

A plurality of subscribers, in other words a plurality of activated mobile radio terminals 118 or mobile radio terminals 118 which have registered in the mobile radio access network, in the same mobile radio cell are preferably separated from one another, for signaling purposes, by means of orthogonal codes, in particular using the so-called CDMA method (Code Division Multiple Access).

In this context, it should be noted that, in order to simplify the illustration, FIG. 1 shows only one mobile radio terminal 118. In general, however, there may be any desired number of mobile radio terminals 118 in the mobile radio system 100.

The communication between a mobile radio terminal 118 and another communication terminal can be set up by means of a complete mobile radio communication link to another mobile radio terminal, or alternatively to a landline communication appliance.

Figure 2:
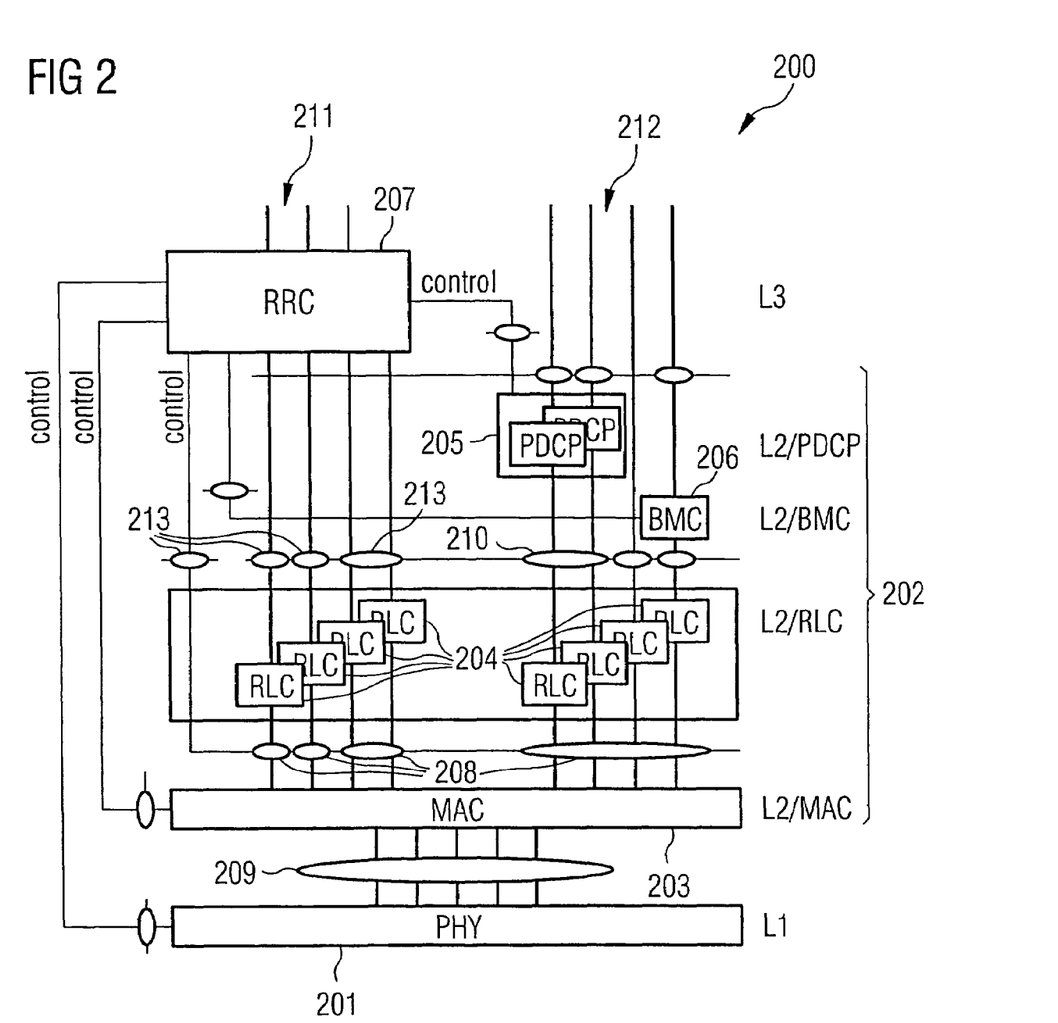
FIG. 2 shows an illustration of a protocol structure for the UMTS air interface.

As is illustrated in FIG. 2, the UMTS air interface 117 is logically subdivided into three protocol layers (symbolized by a protocol layer arrangement 200 in FIG. 2). The units (entities) which ensure and provide the functionality of the respective protocol layers described in the following text are implemented not only in the mobile radio terminal 118 but also in the UMTS base station 108, 109, 110, 111 and/or in the respective mobile radio network control unit 106, 107.

FIG. 2 illustrates the protocol structure 200 from the point of view of the dedicated transport channel DCH (dedicated channel).

The lowermost layer illustrated in FIG. 2 is the physical layer PHY 201, which represents the protocol layer 1 in accordance with the OSI reference model (Open System Interconnection) issued by the ISO (International Standardization Organization).

The protocol layer which is arranged above the physical layer 201 is the datalink layer 202, the protocol layer 2 in accordance with the OSI reference model, which itself has a number of protocol sublayers, specifically the Medium Access Control protocol layer (MAC protocol layer) 203, the Radio Link Control protocol layer 204 (RLC protocol layer), the Packet Data Convergence Protocol layer 205 (PDCP protocol layer) and the Broadcast/Multicast Control protocol layer 206 (BMC protocol layer).

The uppermost layer in the UMTS air interface Uu is the mobile radio network layer (the protocol layer 3 in accordance with the OSI reference model), having the mobile radio resource control unit 207 (Radio Resource Control protocol layer, the RRC protocol layer).

Each protocol layer 201, 202, 203, 204, 205, 206, 207 offers its services to the protocol layer located above it via predetermined, defined, service access points.

In order to assist understanding of the protocol layer architecture, the service access points are provided with generally conventional and unambiguous names, such as logical channels 208 between the MAC protocol layer 203 and the RLC protocol layer 204, transport channels 209 between the physical layer 201 and the MAC protocol layer 203, radio bearers (RB) 210 between the RLC protocol layer 204 and the PDCP protocol layer 205 and the BMC protocol layer 206, as well as signaling radio bearers (SRB) 213 between the RLC protocol layer 204 and the RRC protocol layer 207.

The protocol structure 200 illustrated in FIG. 2 is subdivided, in accordance with UMTS, not only horizontally into the protocol layers, as described above, and entities of the respective protocol layers, but also vertically into a so-called control protocol plane 211 (control plane, C plane), which contains parts of the physical layer 201, parts of the MAC protocol layer 203, parts of the RLC protocol layer 204 and the RLC protocol layer 207, and the user protocol plane 212 (User-Plane, U-plane), which contains parts of the physical layer 201, parts of the MAC protocol layer 203, parts of the RLC protocol layer 204, the PDCP protocol layer 205 and the BMC protocol layer 206.

The entities in the control protocol plane 211 are used exclusively to transmit control data, which is required for setting up and for clearance and for maintenance of a communication link while, in contrast, the actual payload data is transported by means of the entities in the user plane 212.

Details of the protocol layer arrangement 200 are described in 3GPP TS 25.301, Technical Specification, Third Generation Partnership Project; Technical Specification Group Radio Access Network; Radio Interface Protocol Architecture.

Each protocol layer or each unit (entity) in a respective protocol layer has specific, predetermined functions for the purposes of mobile radio communication.

At the transmitter end, the task of the physical layer 201 and of the entities in the physical layer 201 is to ensure reliable transmission of data coming from the MAC protocol layer 203 via the air interface 117. In this context, the data is mapped onto physical channels (not illustrated in FIG. 2). The physical layer 201 offers its services to the MAC protocol layer 203 via transport channels 209, which are used to define how and with what characteristic the data will be transported via the air interface 117. The major functions which are provided by the entities in the physical layer 201 include channel coding, modulation and CDMA code spreading. In a corresponding manner, the physical layer 201 and the entities in the physical layer 201 at the receiver end carry out the CDMA code despreading, the demodulation and the decoding of the received data, and then pass them to the MAC protocol layer 203 for further processing.

The MAC protocol layer 203 or the units of the MAC protocol layer 203 offers or offer its or their services to the RLC protocol layer 204 by means of logical channels 208 as service access points, which is used to characterize the file type relating to the transported data. The task of the MAC protocol layer 203 in the transmitter, that is to say for data transmission in the uplink direction in the mobile radio terminal 118 is, in particular, to map the data which is present in a logical channel 208 above the MAC protocol layer 203 onto the transport channels 209 in the physical layer 201. The physical layer 201 offers discrete transmission rates to the transport channels 209 for this purpose. One important function of the MAC protocol layer 203 and of the entities in the MAC protocol layer 203 in the mobile radio terminal 118 is thus, during transmission, to select a suitable transport format (TF) for each configured transport channel as a function of the respective current data transmission rate and the respective data priority of the logical channels 208, which are mapped onto the respective transport channel 209, and as a function of the available transmission power in the mobile radio terminal 118 (UE). The transport format contains, inter alia, a definition of how many MAC data packet units, referred to as transport blocks, will be sent, or in other words transferred, per transmission time interval TTI via the transport channel 209 to the physical layer 201. The permissible transport formats and the permissible combinations of transport formats of the various transport channels 209 are signaled to the mobile radio terminal 118 from the mobile radio network control unit 106, 107 when a communication link is set up. The entities in the MAC protocol layer 203 in the receiver in turn split the transport blocks received on the transport channels 209 between the logical channels 208.

The MAC protocol layer and the entities in the MAC protocol layer 203 normally has or have three logical entities. The so-called MAC-d entity (MAC dedicated entity) deals with the payload data and the control data, which is mapped via the corresponding dedicated logical channels DTCH (Dedicated Traffic Channel) and DCCH (Dedicated Control Channel) onto the dedicated transport channels DCH (Dedicated Channel). The MAC-c/sh entity (MAC-Control/Shared entity) deals with the payload data and the control data from logical channels 208, which are mapped onto the common transport channels 209, such as that to the common transport channel RACH (Random Access Channel) in the uplink direction, or to the common transport channel FACH (Forward Access Channel) in the downlink direction. The MAC-b entity (MAC broadcast entity) deals only with the system information which is relevant to the mobile radio cell, is mapped via the logical channel BCCH (Broadcast Control Channel) onto the transport channel BCH (Broadcast Channel), and is transmitted by broadcast to all the mobile radio terminals 118 in the respective mobile radio cell.

By means of the RLC protocol layer 204 and by means of the entities in the RLC protocol layer 204, its services are offered to the RRC protocol layer 207 by means of signaling radio bearers (SRB) 213 as service access points, and to the PDCP protocol layer 205 and to the BMC protocol layer 206 by means of radio bearers (RB) 210 as service access points. The signaling radio bearers and the radio bearers characterize how to bypass the RLC protocol layer 204 with the data packets. For this purpose, for example, the RRC protocol layer 207 defines the transmission mode for each configured signaling radio bearer or radio bearer. UMTS provides the following transmission modes:

Transparent Mode (TM),
Unacknowledged Mode (UM), or
Acknowledged Mode (AM).

The RLC protocol layer 204 is modeled so as to provide an autonomous RLC entity for each radio bearer or signaling radio bearer. Furthermore, the task of the RLC protocol layer and its entities 204 in the transmission device is to subdivide or join together the payload data and the signaling data from radio bearers and signaling radio bearers to form data packets. The RLC protocol layer 204 transfers the data packets that have been created after the subdivision or joining together process to the MAC protocol layer 203 for further transport or for further processing.

The PDCP protocol layer 205 or the entities in the PDCP protocol layer 205 is or are designed for transmission or, respectively, for reception of data in the so-called Packet-Switched-Domain (PS domain). The main function of the PDCP protocol layer 205 is compression and decompression of the IP header information (Internet Protocol-Header information).

The BMC protocol layer 206 or its entities is or are used in order to transmit or, respectively, to receive so-called cell broadcast messages via the air interface.

The RRC protocol layer 207 or the entities in the RRC protocol layer 207 is or are responsible for setting up and for clearing, and for reconfiguration, of physical channels, transport channels 209, logical channels 208, signaling radio bearers 213 and radio bearers 210, as well as for dealing with all of the parameters in the protocol layer 1, that is to say the physical layer 201 and the protocol layer 2. For this purpose, the RRC entities, that is to say the entities in the RRC protocol layer 207 in the mobile radio network control unit 106, 107 and the respective mobile radio terminal 118 interchange appropriate RRC messages via the signaling radio bearers 213. Details relating to the RRC layer are described in 3GPP TS 25.331, Technical Specification, Third Generation Partnership Project; Technical Specification Group Radio Access Network; RRC Protocol Specification.

As have been described above, the mobile radio terminal 118 signals at the RRC level to the mobile radio network monitoring unit 106, 107 associated with it information (the so-called measurement report messages) relating to the amount of data traffic in a transport channel, for the purpose of management of the mobile radio resources. In this case, the RLC data buffer filling levels of the relevant transport channel are indicated to the serving mobile radio network control unit (Serving Radio Network Controller, SRNC), that is to say an indication is provided of how much data is currently located in the respective RLC data buffer storages in the mobile radio terminal 118.

The serving mobile radio network control unit 106, 107 then uses this information to appropriately configure the mobile radio terminal 118 in order, for example, to restrict or to increase the usable transport formats in a mobile radio terminal 118, or to carry out a handover to another mobile radio cell, reconfiguration of the dedicated physical channels, or an RRC state change from a first state CELL_DCH to a second state CELL_FACH.

The 3GPP standardization committee is currently working on improving data packet transmission via dedicated transport channels in the uplink path for the UMTS-FDD mode.

In this context, a dedicated transport channel referred to as the Enhanced-DCH (E-DCH) is provided according to the exemplary embodiments of the invention. The major characteristics of this new transport channel include the use of a Hybrid Automatic Repeat Request method (HARQ method) based on the N channel Stop&Wait method, scheduling monitored by a UMTS base station, and provision of frame lengths of no more than 10 ms. The HARQ transmission protection method is used to transmit an acknowledgement that the data has been received correctly or has not been received correctly, from the network to the mobile radio terminal 118. The mobile radio terminal 118 contains various data buffer storages for this function, in order to temporarily store the data until correct reception has been acknowledged. Provision is also made for data items to be subdivided on the basis of their priorities between various data buffer storages, so-called priority queues, with the data items being temporarily stored in the data buffer storages on the basis of their importance, that is to say their prioritization, and thus being processed with greater or lesser preference, depending on a predetermined priority, after their temporary storage in the respective buffer storage.

Figure 3:
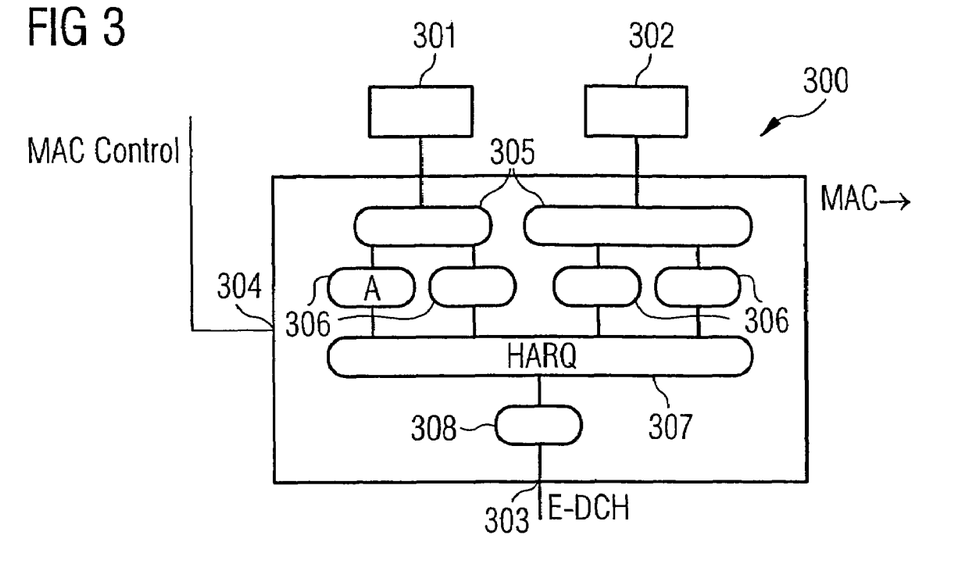
FIG. 3 shows an illustration of the units in an MAC-e protocol sublayer according to a first exemplary embodiment of the invention.

Both functions are implemented in a new sublayer of the MAC protocol layer 203, as is illustrated on the basis of a first embodiment in FIG. 3 as the MAC-e (MAC-Enhanced-Uplink) protocol sublayer 300, which is likewise implemented at both the terminal end, that is to say in the mobile radio terminal 118, and the network end, that is to say in a UMTS base station 108, 109, 110, 111. The MAC-e protocol sublayer 300 receives its data from the MAC-d protocol sublayer via so-called MAC-d flows 301, 302, and transmits its data in turn via the E-DCH transport channel 303 to the physical layer 201.

One important function of the MAC-e protocol sublayer in the subscriber terminal 118 is to carry out the scheduling of the data for the uplink path (uplink communication link) on the basis of a transport format selection method, that is to say to select a suitable transport format for the E-DCH transport channel at defined, predetermined times as a function of the instantaneously permissible transmission rate and/or priority of the data to be transmitted and/or the available transmission power for the E-DCH transport channel.

The MAC-e protocol sublayer 300 or its entities communicates or communicate, for example in order to configure it, with the RRC protocol layer 207 via the MAC control access point 304.

One or more logical channels is or are multiplexed onto a MAC-d flow 301, 302 in the MAC-d protocol sublayer, with each MAC-d flow 301, 302 being allocated a priority in the MAC-d protocol sublayer on the basis of which the priority queue distribution function, which is implemented in a priority queue distribution unit 305 in the MAC-e protocol sublayer 300, subdivides the data between the data buffer storages 306 with the different priorities, that is to say for processing of data of different priorities in a respective data buffer storage, with data of one priority in each case being temporarily stored in one data buffer storage.

As illustrated in FIG. 3, each priority queue 306 can be permanently allocated to one MAC-d flow 301, 302, and there are a defined number of priority queues 306 for each MAC-d flow.

Figure 4:
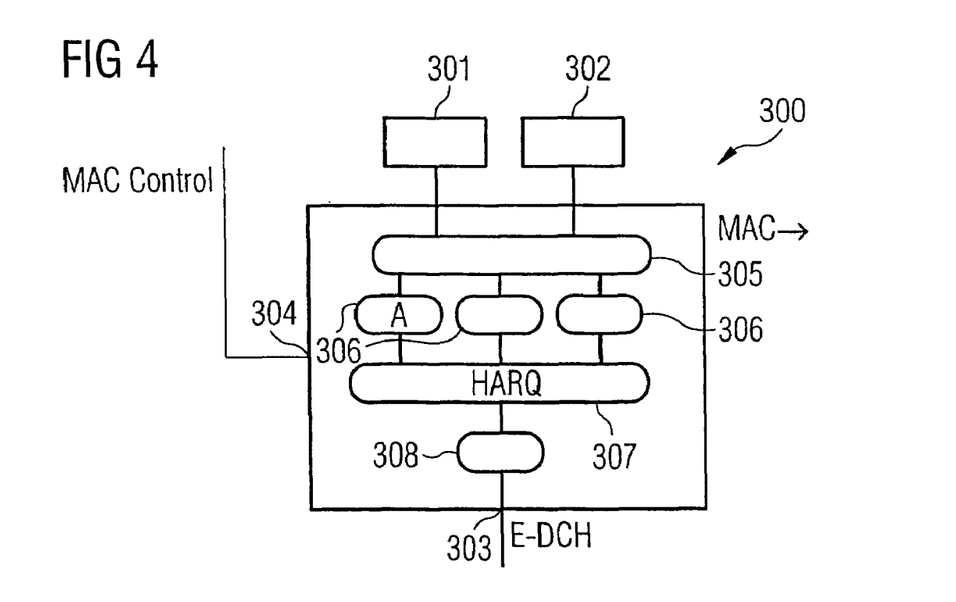
FIG. 4 shows an illustration of the units in an MAC-e protocol sublayer according to a second exemplary embodiment of the invention.

According to a second embodiment, as is illustrated in FIG. 4, a defined number of priority queues 306 for all the MAC-d flows 301, 302 are defined jointly in the MAC-e protocol sublayer 300. In this case, data of the same priority but from different MAC-d flows can be temporarily stored in one priority queue 306.

The data is then temporarily stored in the data buffer storage for the priority queue 306 until it is called up for transmission by means of an HARQ unit 307. In accordance with the N channel Stop&Wait-HARQ method, the HARQ unit 307 comprises a total of N so-called HARQ processes, in which case one HARQ process in each case represents one instance of the Stop&Wait method. For each HARQ process, the HARQ unit 307 takes a number of packet data units (Protocol Data Units, PDUs), on the basis of their priority from the data buffer storages in the priority queues 306, and passes these on via the E-DCH transport channel to the physical layer 201, where they are then transmitted via the air interface 117 to the network, by means of dedicated physical channels.

The HARQ unit 307 temporarily stores the packet data units which are transmitted per HARQ process in a corresponding HARQ buffer storage (not shown) until successful transmission through the network has been acknowledged.

Positive acknowledgement is provided by means of a positive acknowledgement message (Acknowledgement, ACK). If it has not been possible to carry out transmission successfully, in other words in the situation in which the data has not been received correctly, a negative acknowledgement message (Negative Acknowledgement, NACK) is received, in response to which the mobile radio terminal 118 retransmits the data to the UMTS base station 108, 109, 110, 111.

With reference to the nature of the HARQ retransmission, a distinction is drawn between the following types of HARQ methods:

fully synchronous HARQ method:
   in this type of HARQ method, the renewed transmission, that is to say the retransmission, takes place using the same HARQ process as the first transmission of the data.

partially asynchronous HARQ method:
   as in the case of the fully synchronous variant, the retransmission with this type of HARQ method may take place using the same HARQ process as the first transmission. However, in this variant, it is possible to omit the retransmission. However, it is not possible to transmit data for other HARQ processes.

fully asynchronous HARQ method:
   in this type of HARQ method, the retransmission can be sent on any desired HARQ process, irrespective of the HARQ process used for the first transmission of the data.

A transport format selection unit 308, which is coupled to the HARQ unit 307, is responsible for selection of the transport format that is suitable for transmission for each HARQ process.

A set of different transport formats is configured for this purpose in the MAC-e protocol sublayer 300 by means of the RRC protocol layer 207, from which set the TF selection unit 308 selects a suitable transport format for each transmission time interval (TTI) and HARQ process.

The MAC-e protocol sublayer 300 is selected by means of the RRC protocol layer by the mobile radio network control unit 106, 107.

The respectively used transport formats are selected as a function of the instantaneously permissible transmission rate, the priority of the data to be transmitted, and the available transmission power in the mobile radio terminal 118 for the respective E-DCH transport channel.

The instantaneously permissible transmission rate is in this case controlled by the UMTS base station 108, 109, 110, 111. This type of scheduling is for this reason also referred to as NodeB-controlled scheduling. This is controlled in such a way that the UMTS base station 108, 109, 110, 111 can temporarily restrict or extend the use of transport formats from the set of defined transport formats for the E-DCH transport channel by the mobile radio terminal 118 as a function of the respective traffic situation in the mobile radio cell.

The selection of the transport formats which are used for the purposes of the MAC-e protocol sublayer will be explained in more detail in the following text.

The method is carried out by the medium access control unit in the medium access control protocol layer 203.

Figure 6:
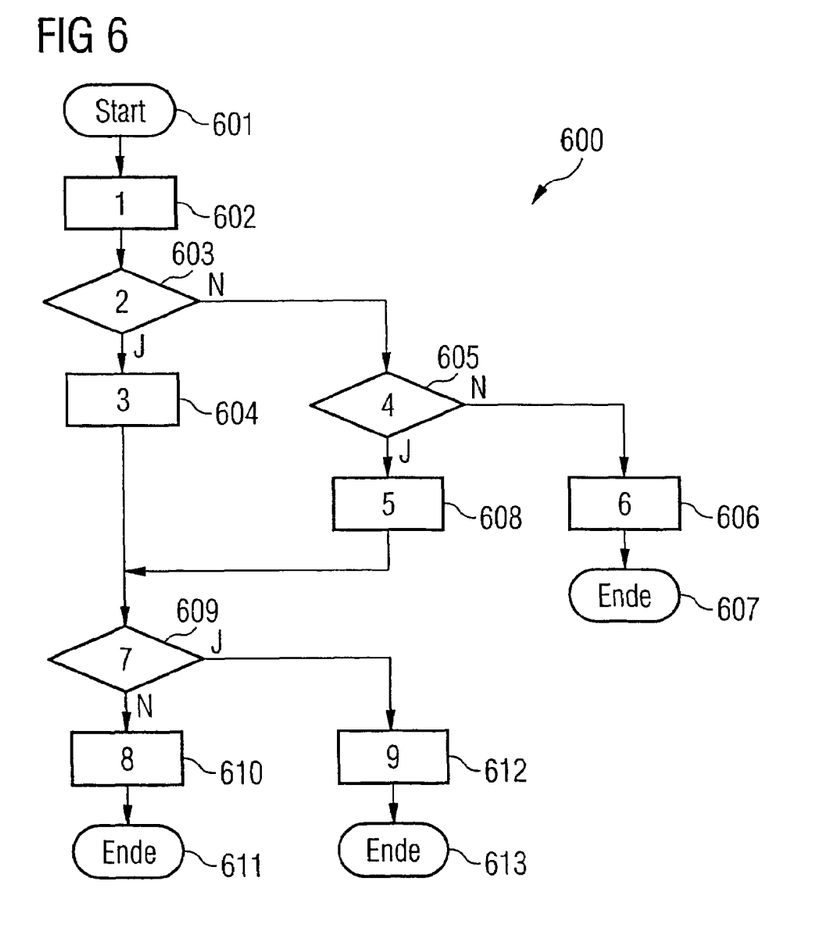
FIG. 6 shows a flowchart, illustrating the method steps for selection of one or more transport formats according to one exemplary embodiment of the invention.

As illustrated in the flowchart 600 in FIG. 6, the method commences, after its start (step 601) with a first step (step 602), in which a first status check of the individual transport formats within the set of transport formats (transport format set) configured for the E-DCH transport channel is carried out for each HARQ process at one or more defined times.

Figure 5:
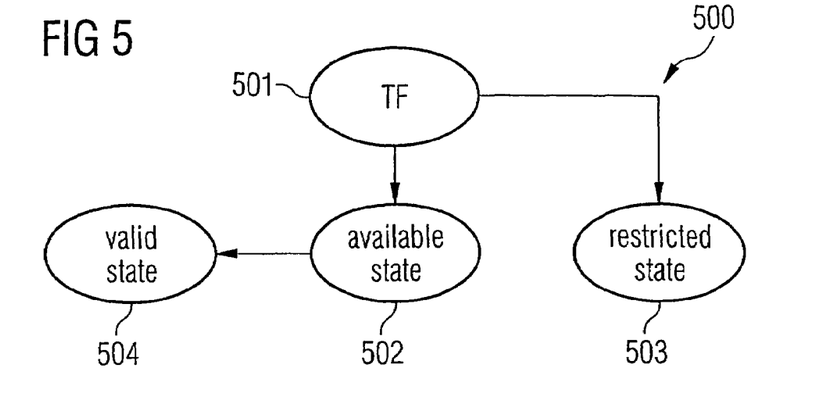
FIG. 5 shows a state diagram, illustrating possible states of a transport format according to one exemplary embodiment of the invention.

On the basis of the first status check, each transport format 501 is allocated one of the following states, in other words each transport format 501 may be in one of the following two states at the start of the method (see the state diagram 500 in FIG. 5):

in a first state 502 "Available State" or
in a second state 503 "Restricted State".

In this context, a check is carried out to determine which transport formats 501 have been temporarily restricted on the basis of the NodeB-controlled scheduling. In other words, a check is carried out for the transport formats 501 to determine whether their usability has been temporarily restricted, or is permitted, by the UMTS base station 108, 109, 110, 111.

All of the transport formats 501 whose temporary usability has not been restricted by the UMTS base station 108, 109, 110, 111 are in the first state 502 "Available State". All the other transport formats 501, that is to say those transport formats 501 whose usability has been temporarily restricted by the UMTS base station 108, 109, 110, 111, are in the second state 503 "Restricted State".

As is illustrated in step 603 in FIG. 6, a second status check is then carried out for all those transport formats which are in the first state 502, "Available State".

The second status check is carried out by means of a power estimate based on the current E-DCH transport channel transmission power and the maximum available E-DCH transport channel transmission power.

All the transport formats in the first state 502 "Available State" which require a transmission power which is less than the maximum available E-DCH transport channel transmission power from the mobile radio terminal 118 are allocated a third state 504 "Valid State", represented by the step 604 in FIG. 6.

If the transport format checked in step 603 is a transport format in a minimum set which includes transport formats whose provision must be ensured in any case by the mobile radio terminal 118, that is to say in accordance with UMTS a transport format from the "Transport Format Minimum Set", then this transport format is in any case allocated the third state 504 "Valid State" irrespective of the result of the second status check in the step 603 (test step 605).

This is because, according to these exemplary embodiments of the invention, the transport formats in the "Transport Format Minimum Set" should not be restricted either by the UMTS-base-station-controlled scheduling or by the second status check in the step 603 in their use by the mobile radio terminal 118.

A check is thus clearly carried out in the test step 605 for those transport formats which require more transmission power than the maximum available E-DCH transport channel transmission power to determine whether that transport format is a transport format in the minimum set, that is to say the transport format minimum set. If this is not the case, then this transport format remains in the first state 502 "Available State" (step 606).

The method for this transport format is then ended (step 607).

In the situation in which it is found for the transport format in the test step 605 that the transport format is in the minimum set, that is to say it is a transport format in the "Transport Format Minimum Set", and a transmission power is required which is greater than the maximum available E-DCH transport channel transmission power, a "measurement report" message is initiated with the "Transport Format Minimum Set Violation" indicator, and is produced by a message generating unit (not illustrated) in the medium access control unit, and is transmitted to the UMTS base station 108, 109, 110, 111 and/or to the mobile radio network control unit 106, 107. The mobile radio terminal 118 in this way signals the overload situation for the E-DCH transport channel transmission power in the mobile radio terminal 118 to the mobile radio network control unit 106, 107. The signaling takes place without any previous checking on the basis of a measurement report message by the mobile radio network control unit 106, 107. The mobile radio network control unit 106, 107 uses this information to carry out any appropriate required configurations of the mobile radio terminal 118, for example reconfiguration of the set of possibly permissible transport formats or the dedicated physical channels for the mobile radio terminal 118, that is to say restriction if appropriate, or even carrying out a handover to another mobile radio cell (step 608).

Once the step 604 or the step 608 has been carried out, a further test step (step 609) is used to check whether a transport format has been allocated to the third state 504 "Valid State" or whether the set of transport formats in this state is empty.

In other words, this step is used to check whether any reliable transport format at all is available for selection for the transmission of data, in particular for the mapping of the data from at least one logical channel to one or more transport channels.

If this is not the case, that is to say there are transport formats in the third state 504, then the selection method for the transport formats by means of the transport format selection unit 308, as illustrated in FIG. 3 and as will be explained in more detail in the following text, takes account only of those transport formats which are in the third state 504 "Valid State". In other words, the transport format selection unit 308 in the medium access control enhanced uplink unit selects a suitable transport format from the transport formats which are in the third state 504 "Valid State", as a function of the following criteria:

the filling levels in the HARQ buffer storages in the HARQ unit 307, and the priority and the filling levels of the individual priority queue buffer storages (step 610).

Once the transport format has been selected in the step 610, the selection method is ended (step 611) and the data is transmitted on the basis of the selected transport format via the E-DCH transport channel 303 to the physical layer 201.

If the HARQ buffer storage for the corresponding HARQ process is full, the retransmission in principle always has higher priority than the transmission of the data from the priority queues 306. This applies to the fully synchronous HARQ method and to the partially asynchronous HARQ retransmission method. In the case of the fully synchronous HARQ retransmission method, the HARQ buffer storages of all the HARQ buffer storages are evaluated and, if at least one of these HARQ buffer storages is full, retransmission is given priority over the data from the priority queues 306.

Depending on the selected transport format, the transport format selection unit 308 takes the equivalent amount of data (MAC-d Protocol Data Units, PDUs) from the priority queue buffer storages or the HARQ buffer storages, and passes them via the E-DCH transport channel to the physical layer 201, from which they are then transmitted via dedicated physical channels via the air interface to the network, in particular to the respectively responsible UMTS base station 108, 109, 110, 111, and via it to the desired recipient.

If it was found in the test step 609 that no transport format is available as a permissible and thus selectable transport format, that is to say, in addition, no transport format in a "Transport Format Minimum Set" is defined within the transport format set either, so that the set of transport formats in the third state 504 "Valid State" is empty, then, in a step 612, the message generating unit (which is not illustrated) initiates a measurement report message with the "Transport Format Valid Set Violation" indicator and transmits this to the UMTS base station 108, 109, 110, 111 and/or to the mobile radio network control unit 106, 107, thus indicating to the latter that there are no permissible transport formats in the mobile radio terminal 118.

The method is then ended in a step 613.

The method described above is then carried out for the next HARQ process once again, with the transport format selection procedure starting directly with the second status check for the next HARQ process, that is to say the step 602 is no longer carried out for the next HARQ process, with this being associated with a considerable computation time saving.

If the UMTS-base-station mcontrolled scheduling changes the set of restricted transport formats, the transport format selection procedure, as is illustrated in FIG. 6, is continued once again with the first status check in the step 602.

For a first exemplary embodiment, it is assumed that the mobile radio terminal 118 is sending packet data via the dedicated transport channel E-DCH to the mobile radio access network UTRAN and therein, in particular, first of all to the UMTS base station 108, 109, 110, 111 which is responsible for the mobile radio terminal 118.

A transmission scenario is assumed, in which the mobile radio subscriber and thus the mobile radio terminal 118 is using three packet services in the uplink data transmission direction in parallel in time, on the basis of this exemplary embodiment a packet service for interactive games on the Internet, a packet service for uploading text files, and a packet service for streaming of video data.

When a communication link is being set up between the mobile radio network and the mobile radio terminal 118, configuration messages are sent to the mobile radio terminal 118 by means of the unit in the RRC protocol layer, implemented both in the mobile radio terminal 118 and in the mobile radio network control unit RNC 106, 107, with whose aid the RRC protocol layer in the mobile radio terminal 118 configures the control parameters for the protocol layers located below this.

An MAC-e protocol sublayer 300 as shown in FIG. 4 is assumed, with three priority queues 306, to which the MAC-d protocol data from the first MAC-d flows 301 and the second MAC-d flows 302 are transmitted from the MAC-d protocol sublayer to the MAC-e protocol sublayer 300, and are temporarily stored in the MAC-e protocol sublayer 300 as a function of their priority in the respective priority queue buffer storages which are allocated to the priority queues 306.

Furthermore, an E-DCH transport channel is configured with the following set of transport formats, from which the transport format selection unit (transport format selection) 308 must select a suitable transport format for each transmission time interval (TTI) and for each HARQ process:

TF0=0*1000 Bits,
TF1=1*1000 Bits,
TF2=2*1000 Bits,
TF3=3*1000 Bits,
TF4=4*1000 Bits,
TF5=6*1000 Bits,
TF6=8*1000 Bits,
TF7=10*1000 Bits.

The set of configured transport formats is stored in a transport format memory (which is not illustrated) for the MAC-e protocol sublayer 300.

It is assumed that the NodeB-controlled scheduling has temporarily restricted the use of the transport formats TF5, TF6 and TF7, that is to say these are not permissible in the mobile radio terminal 118. It is also assumed that, on the basis of this exemplary embodiment, the mobile radio network control unit 106, 107 has defined a "minimum set of transport formats", whose provision must be ensured by the mobile radio terminal 118 in any case, that is to say it has defined a "Transport Format Minimum Set", which comprises the transport formats TF0, TF1 and TF2.

The HARQ method is assumed to be a fully synchronous retransmission method, with four HARQ processes, each having an HARQ buffer storage, being configured in the HARQ unit. The following transport format selection procedure is based on the assumption that the HARQ buffer storages are empty, and that the data transmission is started with the first HARQ process. In this case, the transport format selection unit 308 carries out the following steps in the MAC-e protocol sublayer 300:

First of all, a first status check of the individual transport formats is carried out within the set of transport formats configured for the E-DCH transport channel (step 602).

On the basis of the first status check, the following transport formats are in the first state 502 "Available State": TF0, TF1, TF2, TF3, TF4, and the following transport formats are in the second state 503 "Restricted State": TF5, TF6, TF7.

As described above, a second status check is then carried out in the step 603 for all those transport formats which are in the first state 502 "Available State".

On the basis of this exemplary embodiment, it is assumed that all the transport formats which are in the first state 502 "Available State" require a transmission power for data transmission which is less than the maximum available E-DCH transmission power in the mobile radio terminal 118, so that all of these transport formats TF0, TF1, TF2, TF3, TF4 are allocated the third state 504 "Valid State" in the step 604.

The test step 609 is used to check whether the set of transport formats in the third state 504 "Valid State" is empty.

Since this is not the case, as described above, and since it is also assumed that the HARQ buffer storage for the first HARQ process is empty the transport format selection unit 308 in this case selects a suitable transport format, in the step 610, from the set of transport formats which are in the third state 504 "Valid State", as a function of the priority and the filling levels of the three priority queues 306.

It is also assumed in this exemplary embodiment that only the buffer storage for the first priority queue A is full, with the stored amount corresponding to the transport format TF4. For this reason, the transport format selection unit 308 selects the transport format TF4, takes the equivalent amount of MAC-d protocol data units from the buffer storage for the first priority queue A, and passes these units via the E-DCH transport channel 303 to the physical layer 201, where they are then transmitted via dedicated physical channels, via the air interface, to the UMTS base station 108, 109, 110, 111.

For the next HARQ process, the transport format selection procedure is continued directly with the second status check in the step 603.

As has been described above, the invention results in particular in the following advantages:

an advantageous transport format selection method for the E-DCH transport channel is disclosed, in which the computation load for transport format selection in the mobile radio terminal 118 is considerably reduced by virtue of the method being carried out in two steps and by virtue of the use of the temporary restriction or extension of the permissible transport formats by the UMTS base station.

Overload situations for the E-DCH transmission power in the mobile radio terminal 118 are signaled to the network in the RRC protocol level plane, so that the mobile radio network can carry out efficient mobile radio resource management with the aid of this information.

According to these exemplary embodiments of the invention, different definitions are provided for priority queues.

As illustrated in FIG. 3, each priority queue 306 can be permanently allocated to one MAC-d flow 301, 302, and there are N priority queues 306 for the various priorities for each MAC-d flow. N in this case corresponds to the number of priorities of the logical channels 208 which are multiplexed on the respective MAC-d flow.

Alternatively, it is possible to provide, as illustrated in FIG. 4, for each priority queue 306 to be able to receive data from all the MAC-d flows 301, 302, and in this case there are N priority queues 306 jointly for all the MAC-d flows. In this case, N corresponds to the number of different priorities of the logical channels 208 which are multiplexed onto the MAC-d flows.

A third alternative embodiment of the priority queues 306 provides for one priority queue to be provided for each defined traffic class. There are N priority queues 306 for all the MAC-d flows 301, 302 jointly, as is illustrated in FIG. 4. In this case, N corresponds to the number of traffic classes, for example N=4 for the situation in which the four traffic classes "Conversational", "Streaming", "Interactive" and "Background" are defined.

The MAC-d protocol sublayer in this case signals information to the MAC-e protocol sublayer 300 about the priorities of the logical channels 208 which are multiplexed onto one MAC-d flow, by means of which the priority queue distribution unit 305 in the MAC-e protocol sublayer 300 then subdivides the data between the individual priority queues 306.

What is claimed is:

1. A medium access control unit for a mobile radio device for mapping data to be transmitted by means of the mobile radio device from at least one logical channel to at least one transport channel, comprising:
   at least one transport format memory configured to store a plurality of transport formats, with a transport format including control parameters on the basis of which the data is mapped by the medium access control unit from the at least one logical channel to the at least one transport channel;
   at least one transport format selection unit configured to select a respective transport format to be used from the plurality of stored transport formats, wherein the transport format selection unit is configured such that:
   a) a check is carried out for the stored transport formats in order to determine whether the stored transport formats satisfy a selection criterion which is specific to the mobile radio device and a selection criterion which is predetermined by a mobile radio network unit, and
   b) the transport format which is used for mapping the data to the at least one transport channel is selected from those transport formats which satisfy the selection criterion which is specific to the mobile radio device and the selection criterion which is predetermined by the mobile radio network unit.

2. The medium access control unit as claimed in claim 1, designed as a medium access control unit in a medium access control unit enhanced uplink protocol sublayer.

3. The medium access control unit as claimed in claim 1, wherein the selection criterion which is predetermined by the mobile radio network unit is a set of transport formats which are permissible in the network.

4. The medium access control unit as claimed in claim 1, wherein the selection criterion which is predetermined by the mobile radio network unit is a selection criterion which is predetermined by a mobile radio base station.

5. The medium access control unit as claimed in claim 1, wherein the selection criterion which is specific to the mobile radio device is the maximum available transmission power of the mobile radio device.

6. The medium access control unit as claimed in claim 5, wherein the selection criterion which is specific to the mobile radio device is the maximum available transport channel transmission power of the mobile radio device.

7. The medium access control unit as claimed in claim 2, wherein the selection criterion which is specific to the mobile radio device is the maximum available enhanced uplink transport channel transmission power of the mobile radio device.

8. The medium access control unit as claimed in claim 1, wherein the transport format selection unit is designed such that a predetermined minimum set of transport formats is associated with those transport formats from which the transport format selection unit selects the transport format used for transmission of the data, in step b).

9. The medium access control unit as claimed in claim 8, wherein the transport format selection unit is designed such that a check is carried out to determine whether more transmission power than is available in the mobile radio device is required for transmission of the data using one transport format from the minimum set of transport formats, and
   the medium access control unit further comprises a message generating unit which is designed to form an electronic first message, to be transmitted to the network unit, in the situation where it is found that more transmission power than is available in the mobile radio device is required for transmission of the data using one transport format from the minimum set of transport formats.

10. The medium access control unit as claimed in claim 9, wherein the message generating unit is designed such that the electronic first message is in the form of a measurement report message.

11. The medium access control unit as claimed in claim 1, further comprising a message generating unit which is designed to form an electronic second message, to be transmitted to the network unit, in the situation where it is found in step b) that no transport format is available for selection.

12. The medium access control unit as claimed in claim 11, wherein the message generating unit is designed to form the electronic second message as a measurement report message.

13. A mobile radio device having a medium access control unit as claimed in claim 1.

14. The medium access control unit as claimed in claim 1, wherein the transport format selection unit is configured such a check is carried out for those stored transport formats which satisfy the selection criterion which is predetermined by the mobile radio network unit, in order to determine whether they satisfy the selection criterion which is specific to that mobile radio device.

15. The medium access control unit as claimed in claim 4, wherein the selection criterion which is predetermined by the mobile radio network unit is the maximum permissible data transmission rate of the mobile radio device.

16. The medium access control unit as claimed in claim 1, wherein each transport format is associated with one of two states.

17. The medium access control unit as claimed in claim 16, wherein the transport formats associated with the first state are not selected to be used.

18. The medium access control unit as claimed in claim 1, wherein the data is mapped from the at least one logical channel to a MAC-d-Flow.

19. The medium access control unit as claimed in claim 18, wherein the MAC-d-Flow is allocated at least one priority queue storage.

20. The medium access control unit as claimed in claim 1, wherein the transport format which is used for mapping the data to the at least one transport channel is selected for each transmission time interval of a plurality of transmission lime intervals.

21. The medium access control unit as claimed in claim 1, wherein the mobile radio device is a UTMS mobile radio device and the at least one transport channel is an enhanced dedicated channel.

22. The medium access control unit as claimed in claim 21, wherein the transport format is selected in CELL_DCH state of the mobile radio device.

23. The medium access control unit as claimed in claim 21, wherein the determination whether the transport formats satisfy the selection criterion which is predetermined by a mobile radio network unit or the selection criterion which is specific to that mobile radio device is carried out by means of a power estimate based on the current enhanced dedicated channel transmission power and the maximum available enhanced dedicated channel transmission power.

24. The medium access control unit as claimed in claim 1, further comprising a plurality of priority queue buffer storages, with at least some of the priority queue buffer storages each being allocated a priority value,
wherein the medium access control unit is designed such that the data which is temporarily stored in the respective priority queue buffer storage is read and transmitted as a function of the priority values and/or the filling levels of the priority queue buffer storages.

25. The medium access control unit as claimed in claim 24, further comprising an automatic repeat request control unit configured to carry out one or more automatic repeat request processes for transmission of the data which has been temporarily stored in the priority queue buffer storages.

26. The medium access control unit as claimed in claim 25, wherein the automatic repeat request control unit is configured to carry out one or more hybrid automatic repeat request processes for transmission of the data which has been temporarily stored in the priority queue buffer storages.

27. The medium access control unit as claimed in claim 25, wherein the automatic repeat request control unit is configured to carry out one and only one automatic repeat request process per priority queue buffer storage.

28. The medium access control unit as claimed in claim 25, configured to select one transport format for each automatic repeat request process.

29. The medium access control unit as claimed in claim 28, further comprising one or more automatic repeat request buffer storages, with each automatic repeat request buffer storage being associated with one automatic repeat request process,
wherein the medium access control unit is designed such that the transport format or formats is or are selected as a function of the filling levels of the automatic repeat request buffer storages.

30. A method for mapping data, to be transmitted by a mobile radio device, from at least one logical channel to at least one transport channel in a medium access control protocol layer in the mobile radio device, the method comprising:
a) carrying out a check, by at least one transport format selection unit, for stored transport formats in order to determine whether the stored transport formats satisfy a selection criterion which is specific to the mobile radio device and a selection criterion which is predetermined by a mobile radio network unit, with a transport format including control parameters on the basis of which the data is mapped by the medium access control unit from the at least one logical channel to the at least one transport channel; and
b) selecting, by at least one transport format selection unit, the transport format, which is used for mapping the data to the at least one transport channel, from those transport formats which satisfy the selection criterion which is specific to the mobile radio device and the selection criterion which is predetermined by the mobile radio network unit.

31. A medium access control unit for a mobile radio device for mapping of data to be transmitted by means of the mobile radio device from at least one logical channel to at least one transport channel, comprising:
at least one transport format memory means for storing a plurality of transport formats, with a transport format including control parameters on the basis of which the data is mapped by the medium access control unit from the at least one logical channel to the at least one transport channel;
at least one transport format selection means for selecting a respective transport format to be used from the plurality of stored transport formats, wherein the transport format selection means is designed such that:
a) a check is carried out for the stored transport formats in order to determine whether the stored transport formats satisfy a selection criterion which is specific to the mobile radio device and a selection criterion which is predetermined by a mobile radio network unit, and b) the transport format which is used for mapping the data to the at least one transport channel is selected from those transport formats which satisfy the selection criterion which is specific to the mobile radio device and the selection criterion which is predetermined by the mobile radio network unit.

32. The method for mapping data as claimed in claim 30, further comprising carrying out a check for those stored transport formats which satisfy the selection criterion which is predetermined by the mobile radio network unit, in order to determine whether they satisfy the selection criterion which is specific to that mobile radio device.

33. The method for mapping data as claimed in claim 30, being carried out in a medium access control unit enhanced uplink protocol sublayer.

34. The method for mapping data as claimed in claim 30, wherein the selection criterion which is predetermined by the mobile radio network unit is a set of transport formats which are permissible in the network.

35. The method for mapping data as claimed in claim 30, wherein the selection criterion which is predetermined by the mobile radio network unit is a selection criterion which is predetermined by a mobile radio base station.

36. The method for mapping data as claimed in claim 35, wherein the selection criterion which is predetermined by the mobile radio network unit is the maximum permissible data transmission rate of the mobile radio device.

37. The method for mapping data as claimed in claim 30, wherein the selection criterion which is specific to that mobile radio device is the maximum available transmission power of the mobile radio device.

38. The method for mapping data as claimed in claim 37, wherein the selection criterion which is specific to that mobile radio device is the maximum available transport channel transmission power of the mobile radio device.

39. The method for mapping data as claimed in claim 33, wherein the selection criterion which is specific to that mobile radio device is the maximum available enhanced uplink transport channel transmission power of the mobile radio device.

40. The method for mapping data as claimed in claim 30, wherein step b) further comprises associating a predetermined minimum set of transport formats with those transport formats from those transport formats which satisfy the selection criterion which is specific to the mobile radio device and the selection criterion which is predetermined by the mobile radio network unit.

41. The method for mapping data as claimed in claim 40, further comprising:

carrying out a check to determine whether more transmission power than is available in the mobile radio device is required for transmission of the data using one transport format from the minimum set of transport formats; and generating an electronic first message, to be transmitted to the network unit, in a situation where it is found that more transmission power than is available in the mobile radio device is required for transmission of the data using one transport format from the minimum set of transport formats.

42. The method for mapping data as claimed in claim 41, wherein the electronic first message is in a form of a measurement report message.

43. The method for mapping data as claimed in claim 30, further comprising forming an electronic second message, to be transmitted to the network unit, in a situation where it is found in step b) that no transport format is available for selection.

44. The method for mapping data as claimed in claim 43, wherein the electronic second message is a measurement report message.

45. The method for mapping data as claimed in claim 30, wherein each transport format is associated with one of two states.

46. The method for mapping data as claimed in claim 45, wherein the transport formats associated with the first state are not selected to be used.

47. The method for mapping data as claimed in claim 30, further comprising mapping the data from the at least one logical channel to a MAC-d-Flow.

48. The method for mapping data as claimed in claim 47, wherein the MAC-d-Flow is allocated at least one priority queue storage.

49. The method for mapping data as claimed in claim 30, further comprising selecting the transport format which is used for mapping the data to the at least one transport channel for each transmission time interval of a plurality of transmission time intervals.

50. The method for mapping data as claimed in claim 30, wherein the mobile radio device is a UTMS mobile radio device and the at least one transport channel is an enhanced dedicated channel.

51. The method for mapping data as claimed in claim 50, wherein the transport format is selected in the CELL_DCH state of the mobile radio device.

52. The method for mapping data as claimed in claim 50, further comprising determining whether the transport formats satisfy the selection criterion which is predetermined by a mobile radio network unit or the selection criterion which is specific to that mobile radio device using a power estimate based on the current enhanced dedicated channel transmission power and the maximum available enhanced dedicated channel transmission power.

* * * * *